United States Patent
Mitchell et al.

(10) Patent No.: US 11,492,457 B2
(45) Date of Patent: Nov. 8, 2022

(54) CURABLE FLUOROPOLYMER COMPOSITIONS COMPRISING A COMPOUND CONTAINING A PHTHALONITRILE AND A NUCLEOPHILIC FUNCTIONAL GROUP AND CURED ARTICLES THEREFROM

(71) Applicant: 3M INNOVATIVE PROPERTIES COMPANY, St. Paul, MN (US)

(72) Inventors: Michael H. Mitchell, Edina, MN (US); Benjamin J. Anderson, Eden Prairie, MN (US); Gregg D. Dahlke, St. Paul, MN (US); Tatsuo Fukushi, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/601,779

(22) PCT Filed: May 18, 2020

(86) PCT No.: PCT/IB2020/054682
§ 371 (c)(1),
(2) Date: Oct. 6, 2021

(87) PCT Pub. No.: WO2020/245683
PCT Pub. Date: Dec. 10, 2020

(65) Prior Publication Data
US 2022/0204723 A1 Jun. 30, 2022

Related U.S. Application Data

(60) Provisional application No. 62/857,983, filed on Jun. 6, 2019.

(51) Int. Cl.
| | |
|---|---|
| *C08K 5/00* | (2006.01) |
| *C08K 5/315* | (2006.01) |
| *C08K 5/372* | (2006.01) |
| *C08K 5/46* | (2006.01) |
| *C08K 5/14* | (2006.01) |
| *C08K 5/3492* | (2006.01) |
| *C08K 5/18* | (2006.01) |
| *C08L 27/16* | (2006.01) |
| *C08L 27/18* | (2006.01) |

(52) U.S. Cl.
CPC .......... *C08K 5/0025* (2013.01); *C08K 5/14* (2013.01); *C08K 5/18* (2013.01); *C08K 5/315* (2013.01); *C08K 5/34924* (2013.01); *C08K 5/3725* (2013.01); *C08K 5/46* (2013.01); *C08L 27/16* (2013.01); *C08L 27/18* (2013.01); *C08L 2201/08* (2013.01)

(58) Field of Classification Search
CPC ........ C08K 5/0025; C08K 5/14; C08K 5/315; C08K 5/3725; C08K 5/46; C08L 27/16; C08L 27/18
See application file for complete search history.

(56) References Cited

U.S. PATENT DOCUMENTS

| | | | |
|---|---|---|---|
| 3,876,654 A | 4/1975 | Pattison | |
| 4,233,421 A | 11/1980 | Worm | |
| 4,882,390 A | 11/1989 | Kolb | |
| 4,912,171 A | 3/1990 | Grootaert | |
| 5,086,123 A | 2/1992 | Guenthner | |
| 5,225,504 A | 7/1993 | Tatsu | |
| 5,262,490 A | 11/1993 | Kolb | |
| 5,500,042 A | 3/1996 | Grootaert | |
| 5,591,804 A | 1/1997 | Coggio | |
| 5,929,169 A | 7/1999 | Jing | |
| 6,191,233 B1 | 2/2001 | Kishine | |
| 8,138,271 B2 | 3/2012 | Washino | |
| 2007/0299186 A1* | 12/2007 | Chan | C08K 5/50 524/121 |
| 2018/0013553 A1 | 1/2018 | Hassan | |
| 2018/0155276 A1 | 6/2018 | Kim | |

(Continued)

FOREIGN PATENT DOCUMENTS

| | | |
|---|---|---|
| WO | WO 2018-136331 | 7/2018 |
| WO | WO 2020-121125 | 6/2020 |

OTHER PUBLICATIONS

Phthalonitriles, Polymer Properties Database, 2015, (Year: 2015).*
"Phthalonitriles (PN)", Polymer Properties Database (polymerdatabase.com), Jan. 1, 2015, pp. 1-5, XP05570413.
International Search Report for PCT International Application No. PCT/IB2020/054682, dated Jul. 2, 2020, 3 pages.

*Primary Examiner* — Robert D Harlan
(74) *Attorney, Agent, or Firm* — Julie Lapos-Kuchar

(57) ABSTRACT

Described herein are fluoropolymer compositions comprising a compound of Formula I wherein $X^1$ is selected from O or S; L is a divalent linking group comprising at least one aromatic ring; and $X^2$ is selected from the group consisting of a hydroxyl group, an amino group, a thiol group, and a nitrile group. In one embodiment, the phthalonitrile-containing compound is used to crosslink a dehydrohalogenated polymer, and optionally with a polyhydroxy curative. In another embodiment, the phthalonitrile-containing compound is added to a composition comprising (i) a fluorinated elastomeric gum, wherein the fluorinated elastomeric gum comprises a fluoropolymer having a cure-site and (ii) a peroxide curing system.

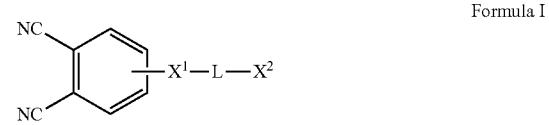

Formula I

19 Claims, No Drawings

(56) References Cited

U.S. PATENT DOCUMENTS

2018/0194888 A1     7/2018   Mitchell
2019/0352444 A1   11/2019   Mitchell
2021/0340355 A1   11/2021   Anderson \* cited by examiner

CURABLE FLUOROPOLYMER COMPOSITIONS COMPRISING A COMPOUND CONTAINING A PHTHALONITRILE AND A NUCLEOPHILIC FUNCTIONAL GROUP AND CURED ARTICLES THEREFROM

TECHNICAL FIELD

A compound comprising a phthalonitrile group and a nucleophilic functional group is described for use as an additive and/or curing agent in curable fluoropolymers.

SUMMARY

There is a desire to identify novel curing systems for fluoropolymers, which are more environmentally friendly, and have improved properties, such as improved resistance to heat aging, tensile strength, elongation at break, and/or compression set.

In one aspect, a curable composition is described comprising (a) an amorphous fluorinated polymer, and (b) a compound of Formula I

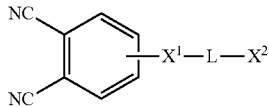

wherein $X^1$ is selected from O or S; L is a divalent linking group comprising at least one aromatic ring; and $X^2$ is selected from the group consisting of a hydroxyl group, an amino group, a thiol group, and a nitrile group.

In another aspect, a curable composition is described comprising (a) a fluorinated elastomeric gum, wherein the fluorinated elastomeric gum comprises a fluoropolymer, and wherein the fluoropolymer comprises at least one of —I, —Br, and —CN cure site, (b) a peroxide curing system comprising a peroxide and a coagent, and (c) a compound of Formula I

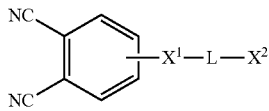

(I)

wherein $X^1$ is selected from O or S; L is a divalent linking group comprising at least one aromatic ring; and $X^2$ is selected from the group consisting of a hydroxyl group, an amino group, a thiol group, and a nitrile group.

In one aspect, the curable composition from above is cured to form an article such as an o-ring, a seal, a gasket, a hose, or a sheet.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B);

"backbone" refers to the main continuous chain of the polymer;

"crosslinking" refers to connecting two pre-formed polymer chains using chemical bonds or chemical groups;

"cure site" refers to functional groups, which may participate in crosslinking;

"interpolymerized" refers to monomers that are polymerized together to form a polymer backbone;

"monomer" is a molecule which can undergo polymerization which then form part of the essential structure of a polymer;

"perfluorinated" means a group or a compound derived from a hydrocarbon wherein all hydrogen atoms have been replaced by fluorine atoms. A perfluorinated compound may however still contain other atoms than fluorine and carbon atoms, like oxygen atoms, chlorine atoms, bromine atoms and iodine atoms; and "polymer" refers to a macrostructure having a number average molecular weight (Mn) of at least 30,000 dalton, at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the polymer.

As used herein, and known in the art, a line intersecting a bond of an aromatic ring, such as shown in this structure

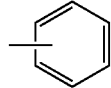

represents a bond that is attached to any one of the unsubstituted carbon atom vertices of the ring.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

As used herein, "comprises at least one of" A, B, and C refers to element A by itself, element B by itself, element C by itself, A and B, A and C, B and C, and a combination of all three.

The present disclosure is directed toward compounds containing a phthalonitrile group and a nucleophilic functional group. These compounds can be used in curable fluoropolymer compositions as an additive, a curing agent, and/or a curing coagent.

Phthalonitrile-containing compound

The phthalonitrile-containing compounds of the present disclosure are according to Formula (I):

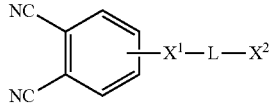

wherein $X^1$ is selected from O or S; L is a divalent linking group comprising at least one aromatic ring; and $X^2$ is selected a hydroxyl group, an amino group, a thiol group, or a nitrile group, wherein $X^1$ and $X^2$ are each directly attached to a sp$^2$ carbon of L.

L is a divalent linking group which comprises at least one 5 or 6-membered aromatic ring (i.e., comprising 5 or 6 atoms in a ringed structure). In one embodiment, additional substituents (such as alkyl, alkoxy, halogen, another aromatic group) are present off the divalent aromatic ring group.

In one embodiment, L is a phenylene or substituted phenylene. For example, in one embodiment, L is

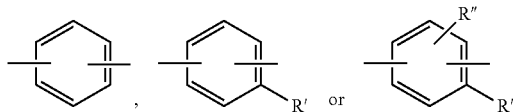

where the two horizontal lines in each structure represent (i) a bond between one vertex of the aromatic ring and $X^1$ and (ii) a bond between a different vertex of the aromatic ring and $X^2$. These two bonds may be ortho, meta, or para to each other. In addition to these two bonds, there may be other non-functional groups bonded to the aromatic ring, such as shown by R' and R" above, which do not cause steric hindrance, such non-functional groups include short chain (e.g., C1-C4) alkyl and alkoxy groups. Exemplary R' and R" groups include: methyl, methoxy, ethyl, and ethoxy groups.

In another embodiment, L comprises more than one aromatic group, such as naphthalene, anthracenes, phenantherene, or a divalent group of the following structure:

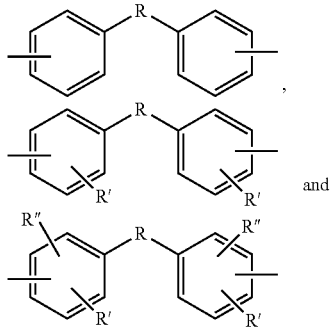

where R is selected from the group consisting of —S—, —O—, —C(CF$_3$)$_2$—, —C(CH$_3$)$_2$—, —CH$_2$—, —SO$_2$—, —C(=O)—, and —C(CH$_3$)$_2$—C$_6$H$_4$—C(CH$_3$)$_2$—. In the above structure for L, the bonds linking L to $X^1$ and $X^2$ of the phthalonitrile-containing compound can be in any position with respect to the R group. For example, the bonds to $X^1$ and $X^2$ can independently be ortho, meta, or para to the R group. More preferably, the bonds to $X^1$ and $X^2$ are either both ortho, both meta, or both para with respect to the R group. In addition to the two bonds between the phenylene and $X^1$, and the phenylene and R, there may be other non-functional groups bonded to the phenylene, which do not cause steric hindrance, such non-functional groups include short chain (e.g., C1-C4) alkyl and alkoxy groups. Exemplary R' and R" groups include: methyl, methoxy, ethyl, and ethoxy groups.

In another embodiment, L is a divalent 5-membered aromatic group selected from at least one of a pyrrole, a furan, an imidazole, a pyridine, a thiophene, and combinations thereof.

$X^2$ is a nucleophilic functional group which is adjacent to the aromatic ring and has access to the conjugation of the linking group. Thus, in one embodiment, both $X^1$ and $X^2$ are each directly attached to a sp$^2$ carbon of L.

In one embodiment, $X^2$ is an amino group. For example, the amino group may be a primary amine, or a secondary amine (e.g., —NHR, wherein R is C1-C6 alkyl, C3-C8 aryl, or C3-C10 alkaryl).

In one embodiment, —L—$X^2$ is a hydroxyphenol group.

In one embodiment, —$X^1$-L-$X^2$ is

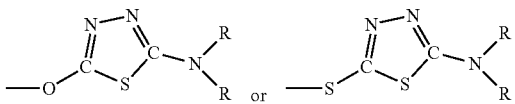

when R is independently selected from H, or a C1-C6 alkyl group.

In one embodiment, —$X^1$-L-$X^2$ is

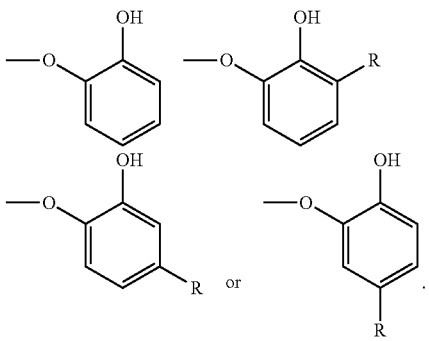

where R is a C1-C6 alkyl group such as methyl or ethyl.

In one embodiment, —$X^1$-L-$X^2$ is

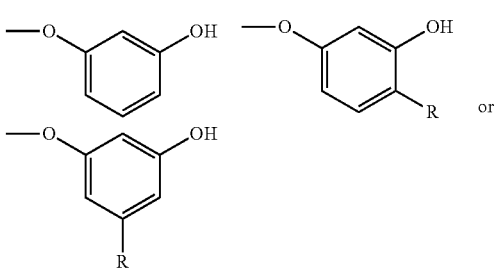

where R is a C1-C6 alkyl group such as methyl or ethyl.

Exemplary compounds of Formula (I) include:

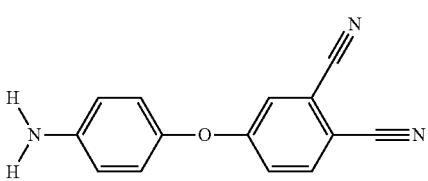

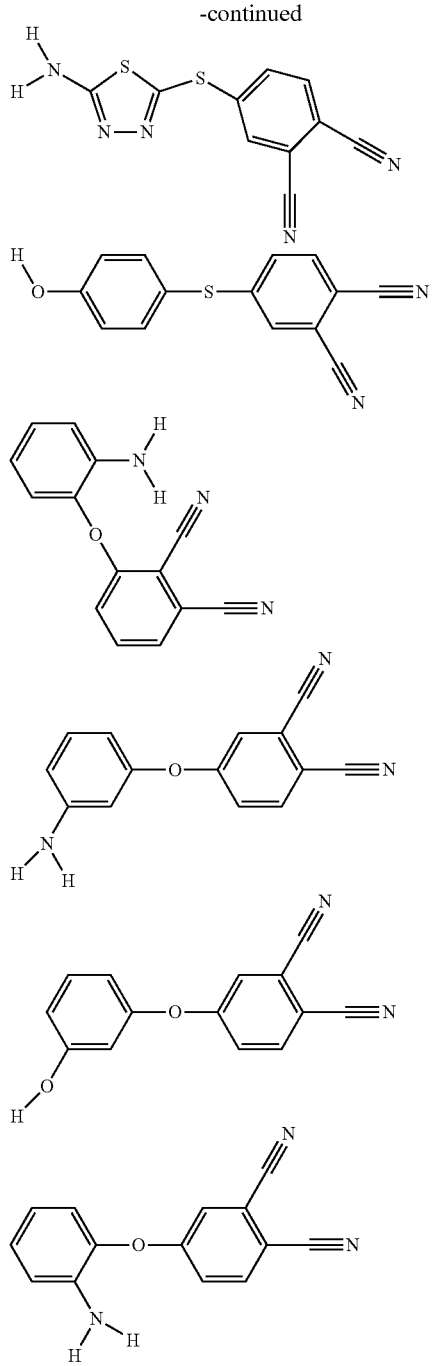

Curable Composition 1:

In one embodiment of the present disclosure, the phthalonitrile-containing compound is combined with an amorphous partially fluorinated polymer comprising carbon-carbon double bonds and/or is capable of forming carbon-carbon double bonds along the polymer chain to form a fluoroelastomer.

The amorphous partially fluorinated polymer is a polymer comprising at least one carbon-hydrogen bond and at least one carbon-fluorine bond on the backbone of the polymer. In one embodiment, the amorphous partially fluorinated polymer is highly fluorinated, wherein at least 60, 70, 80, or even 90% of the polymer backbone comprises C—F bonds.

The amorphous partially fluorinated polymer of the present disclosure also comprises carbon-carbon double bonds and/or is capable of forming carbon-carbon double bonds along the polymer chain. In one embodiment, the amorphous partially fluorinated fluoropolymer comprises carbon-carbon double bonds along the backbone of the partially fluorinated amorphous fluoropolymer or is capable of forming carbon-carbon double bonds along the backbone of the partially fluorinated amorphous fluoropolymer. In another embodiment, the amorphous partially fluorinated fluoropolymer comprises carbon-carbon double bonds or is capable of forming carbon-carbon double bonds in a pendent group off of the backbone of the partially fluorinated amorphous fluoropolymer.

The fluoropolymer capable of forming carbon-carbon double bonds means that the fluoropolymer contains units capable of forming double bonds. Such units include, for example, two adjacent carbons along the polymer backbone or pendent side chain, wherein a hydrogen is attached to the first carbon and a leaving group is attached to the second carbon. During an elimination reaction (e.g., thermal reaction, and/or use of acids or bases), the leaving group and the hydrogen leave forming a double bond between the two carbon atoms. An exemplary leaving group includes: a halide, an alkoxide, a hydroxide, a tosylate, a mesylate, an amine, an ammonium, a sulfide, a sulfonium, a sulfoxide, a sulfone, and combinations thereof. Also contemplated would be a fluoropolymer comprising adjacent carbons either having both bromine or both iodine atoms attached resulting in the leaving of $Br_2$ or $I_2$.

The amorphous partially fluorinated polymer comprises a plurality of these groups (carbon-carbon double bonds or groups capable of forming double bonds) to result in a sufficient cure. Generally, this means at least 0.1, 0.5, 1, 2, or even 5 mol % at most 7, 10, 15, or even 20 mol % (i.e., moles of these carbon-carbon double bonds or precursors thereof per mole of polymer).

In one embodiment, the amorphous partially fluorinated polymer is derived from at least one hydrogen containing monomer such as vinylidene fluoride.

In one embodiment, the amorphous partially fluorinated polymer comprises adjacent copolymerized units of vinylidene fluoride (VDF) and hexafluoropropylene (HFP); copolymerized units of VDF (or tetrafluoroethylene) and a fluorinated comonomer capable of delivering an acidic hydrogen atom to the polymer backbone, such as trifluoroethylene; vinyl fluoride; 3,3,3-trifluoropropene-1; pentafluoropropene (e.g., 2-hydropentafluoropropylene and 1-hydropentafluoropropylene); 2,3,3,3-tetrafluoropropene; and combinations thereof.

In some embodiments, small amounts (e.g., less than 10, 5, 2, or even 1 wt %) of additional monomers may be used to derive the amorphous partially fluorinated polymer so long as the fluorinated polymer is able to be cured with the compound of Formula I as disclosed herein, and optionally with a polyhydroxy curative.

In one embodiment, the amorphous partially fluorinated polymer is additionally derived from a hydrogen containing monomer including: pentafluoropropylene (e.g., 2-hydropentafluropropylene), propylene, ethylene, isobutylene, and combinations thereof.

In one embodiment, the amorphous partially fluorinated polymer is additionally derived from a perfluorinated monomer. Exemplary perfluorinated monomers include: hexafluoropropene;
tetrafluoroethylene; chlorotrifluoroethylene; perfluoro ether monomers, and combinations thereof.

Exemplary perfluoro ether monomers are of the Formula (II)

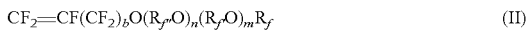

$$CF_2{=}CF(CF_2)_bO(R_{f'}O)_n(R_{f'}O)_mR_f \qquad (II)$$

where $R_{f'}$ and $R_{f'}$ are independently linear or branched perfluoroalkylene radical groups comprising 2, 3, 4, 5, or 6 carbon atoms, m and n are independently an integer selected from 0, 1, 2, 3, 4, 5, 6, 7, 8, 9, and 10, and $R_f$ is a perfluoroalkyl group comprising 1, 2, 3, 4, 5, or 6 carbon atoms. Exemplary perfluoroalkyl vinyl ether monomers include: perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, perfluoro-methoxy-methylvinylether ($CF_3$—O—$CF_2$—O—CF=$CF_2$), and $CF_3$—$(CF_2)_2$—O—CF($CF_3$)—$CF_2$—O—CF($CF_3$)—$CF_2$—O—CF=$CF_2$. Exemplary perfluoroalkyl allyl ether monomers include: perfluoro (methyl allyl) ether ($CF_2$=CF—$CF_2$—O—$CF_3$), perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxy-methyl allyl ether, and $CF_3$—$(CF_2)_2$—O—CF($CF_3$)—$CF_2$—O—CF($CF_3$)—$CF_2$—O—$CF_2CF$=$CF_2$.

Exemplary types of amorphous partially fluorinated polymers include those comprising interpolymerized units derived from (i) vinylidene fluoride, tetrafluoroethylene, and propylene; (ii) vinylidene fluoride with hexafluoropropylene; (iii) hexafluoropropylene, tetrafluoroethylene, and vinylidene fluoride; (iv) hexafluoropropylene and vinylidene fluoride, (v) tetrafluoroethylene, propylene, and 3,3,3-trifluoropropene; (vi) tetrafluoroethylene, and propylene; and (vii) blends thereof.

In one embodiment of the present disclosure, the amorphous partially fluorinated polymer is cured with the compound according to Formula I and is substantially free (having less than 0.05, less than 0.01, less than 0.05 wt % or even none relative to the amorphous partially fluorinated polymer) of a traditional curative (such as peroxide, and/or polyhydroxy curing agent). Typically, at least 0.05, 0.1 or even 1 part; and at most 2, 4, 6, or even 10 parts by weight of the compound according to Formula I is used per 100 parts by weight of amorphous partially fluorinated polymer. The extent of the cure and performance can be measured by hardness, tensile properties (such as tensile at break, elongation at break, tensile at 50% elongation, and/or tensile at 100% elongation), and/or compression set.

In another embodiment of the present disclosure, the amorphous partially fluorinated polymer is cured with the compound according to Formula I and a polyhydroxy compound. Polyhydroxy compounds include those known in the art to function as a crosslinking agent or co-curative for elastomers, such as those polyhydroxy compounds disclosed in U.S. Pat. Nos. 3,876,654 (Pattison), and 4,233,421 (Worm), which are both herein incorporated by reference. Representative examples include aromatic polyhydroxy compounds, preferably any one of the following: di-, tri-, and tetrahydroxybenzenes, and bisphenols. Exemplary aromatic polyhydroxy compounds include: 4,4'-hexafluoroisopropylidenyl bisphenol, known more commonly as bisphenol AF. Further useful examples include 4,4'-dihydroxydiphenyl sulfone (also known as Bisphenol S) and 4,4'-isopropylidenyl bisphenol (also known as bisphenol A) or 4,4'(perfluoropropane-2,2-diyl)diphenol, dihydroxybenzophenone, hydroquinone, 2,4,6-trimercapto-S-triazine, 4,4'-thiodiphenol, and metal salts thereof.

Typically, at least 0.05, 0.1 or even 1% weight; and at most 2, 4, 6, or even 10% weight of the compound according to Formula I is used versus the weight of the amorphous partially fluorinated polymer and at least 0.05, 0.1 or even 1% weight; and at most 2, 2.5, 3, 4, 4.5, or even 5% weight of the polyhydroxy compound is used versus the amorphous partially fluorinated polymer.

The curable composition 1 may further comprise an organo-onium compound added to the composition as a phase transfer catalyst to assist with the crosslinking of the amorphous partially fluorinated polymer and/or may be used to generate the double bonds on the polymer through dehydrofluorination. Such organo-onium compounds include quaternary ammonium hydroxides or salts, quaternary phosphonium hydroxides or salts, and ternary sulfonium hydroxides or salts.

Briefly, a phosphonium and ammonium salts or compounds comprise a central atom of phosphorous or nitrogen, respectively, covalently bonded to four organic moieties by means of a carbon-phosphorous (or carbon-nitrogen) covalent bonds and is ionically associated with an anion. The organic moieties can be the same or different.

Briefly, a sulfonium compound is a sulfur-containing organic compound in which at least one sulfur atom is covalently bonded to three organic moieties having from 1 to 20 carbon atoms by means of carbon-sulfur covalent bonds and is ionically associated with an anion. The organic moieties can be the same or different. The sulfonium compounds may have more than one relatively positive sulfur atom, e.g. $[(C_6H_5)_2S^+(C_6H_3)_4S^+(C_6H_5)_2]_2Cl^-$, and two of the carbon-sulfur covalent bonds may be between the carbon atoms of a divalent organic moiety, i.e., the sulfur atom may be a heteroatom in a cyclic structure.

Organo-onium compounds are known in the art, such as in U.S. Pat. No. 4,233,421 (Worm), U.S. Pat. No. 4,912,171 (Grootaert et al.), U.S. Pat. No. 5,086,123 (Guenthner et al.), and U.S. Pat. No. 5,262,490 (Kolb et al.), and U.S. Pat. No. 5,929,169, all of whose descriptions are herein incorporated by reference. Another class of useful organo-onium compounds include those having one or more pendent fluorinated alkyl groups. Generally, the most useful fluorinated onium compounds are disclosed in U.S. Pat. No. 5,591,804 (Coggio, et al.).

Exemplary organo-onium compounds include: $C_3$-$C_6$ symmetrical tetraalkylammonium salts, unsymmetrical tetraalkylammonium salts wherein the sum of alkyl carbons is between 8 and 24 and benzyltrialkylammonium salts wherein the sum of alkyl carbons is between 7 and 19 (for example tetrabutylammonium bromide, tetrabutylammonium chloride, benzyltributylammonium chloride, benzyltriethylammonium chloride, tetrabutylammonium hydrogen sulfate and tetrabutylammonium hydroxide, phenyltrimethylammonium chloride, tetrapentylammonium chloride, tetrapropylammonium bromide, tetrahexylammonium chloride, and tetrapentylammonium bromidetetramethylammonium chloride); quaternary phosphonium salts, such as tetrabutylphosphonium salts, tetraphenylphosphonium chloride, benzyltriphenylphosphonium chloride, tributylallylphosphonium chloride, tributylbenzyl phosphonium chloride, tributyl-2-methoxypropylphosphonium chloride, benzyldiphenyl(dimethylamino)phosphonium chloride, 8-benzyl-1,8-diazabicyclo[5 0.4.0]7-undeceniuM chloride, benzyltris(dimethylamino)phosphonium chloride, and bis(benzyldiphenylphosphine)iminium chloride. Other suitable organo-onium compounds include 1,8-diazabicyclo[5.4.0]undec-7-ene and 5-diazabicyclo[4.3.0]

non-5-ene. Phenolate is a preferred anion for the quaternary ammonium and phosphonium salts.

In one embodiment, the organo-onium compound is used from at least 1, 1.5, 2, or even 2.5 millimoles and at most 3.5, 4, 4.5 or even 5 millimoles per 100 parts (by weight in grams) of the amorphous partially fluorinated polymer.

The amorphous partially fluorinated polymer in curable composition 1, should be substantially free of iodine, bromine, and/or nitrile cure sites, meaning that the fluorinated polymer comprises less than 0.1, 0.05, 0.01, or even 0.005 wt % or even no I, Br, and C≡N versus the weight of the amorphous partially fluorinated polymer.

Curable Composition 2

In another embodiment of the present disclosure, the phthalonitrile-containing compound of Formula I is combined with a fluorinated elastomeric gum. The fluorinated elastomeric gum comprises a fluorinated polymer wherein the fluorinated polymer comprises a cure-site (I, Br, and/or CN). The mixture (i.e., the phthalonitrile-containing compound and the fluorinated elastomeric gum) is subsequently cured to form a fluoroelastomer.

In one embodiment, the fluorinated polymer contains cure sites, which facilitate cross-linking of the fluorinated polymer in appropriate cure systems. These cure sites comprise at least one of iodine, bromine, and/or nitrile. The fluorinated polymer may be polymerized in the presence of a chain transfer agent and/or cure site monomer to introduce cure sites into the polymer. Such cure site monomers and chain transfer agents are known in the art. Exemplary chain transfer agents include: an iodo-chain transfer agent, a bromo-chain transfer agent, or a chloro-chain transfer agent. For example, suitable iodo-chain transfer agent in the polymerization include the formula of $RI_x$, where (i) R is a perfluoroalkyl or chloroperfluoroalkyl group having 3 to 12 carbon atoms; and (ii) x=1 or 2. The iodo-chain transfer agent may be a perfluorinated iodo-compound. Exemplary iodo-perfluoro-compounds include 1,3-diiodoperfluoropropane, 1,4-diiodoperfluorobutane, 1, 6-diiodoperfluorohexane, 1,8-diiodoperfluorooctane, 1,10-diiodoperfluorodecane, 1,12-diiodoperfluorododecane, 2-iodo-1,2-dichloro-1, 1,2-trifluoroethane, 4-iodo-1,2,4-trichloroperfluorobutan, and mixtures thereof. In some embodiments, the iodo-chain transfer agent is of the formula $I(CF_2)_n$—O—$R(CF_2)_m I$, wherein n is 1, 2, 3, 4, 5, 6, 7, 8, 9, or 10, m is 1, 2, 3, 4, 5, 6, 7, 8, 9, or 10 and $R_f$ is a partially fluorinated or perfluorinated alkylene segment, which can be linear or branched and optionally comprises at least one catenated ether linkage. Exemplary compounds include: I—$CF_2$—$CF_2$—O—$CF_2$—$CF_2$—I, I—$CF(CF_3)$—$CF_2$—O—$CF_2$—$CF_2$—I, I—$CF_2$—$CF_2$—O—$CF(CF_3)$—$CF_2$—O—$CF_2$—$CF_2$—I, I—$(CF(CF_3)$—$CF_2$—$O)_2$—$CF_2$—$CF_2$—I—I—$CF_2$—$CF_2$—O—$(CF_2)_2$—O—$CF_2$—$CF_2$—I, I—$CF_2$—$CF_2$—O—$(CF_2)_3$—O—$CF_2$—$CF_2$—I, and I—$CF_2$—$CF_2$—O—$(CF_2)_4$—O—$CF_2$—$CF_2$—I, I—$CF_2$—$CF_2$—$CF_2$—O—$CF_2$—$CF_2$—I, and I—$CF_2$—$CF_2$—$CF_2$—O—$CF(CF_3)$—$CF_2$—O—$CF_2$—$CF_2$—I. In some embodiments, the bromine is derived from a brominated chain transfer agent of the formula: $RBr_x$, where (i) R is a perfluoroalkyl or chloroperfluoroalkyl group having 3 to 12 carbon atoms; and (ii) x=1 or 2. The chain transfer agent may be a perfluorinated bromo-compound.

Cure site monomers, if used, comprise at least one of a bromine, iodine, and/or nitrile cure moiety.

In one embodiment, the cure site monomers may be of the formula: (a) $CX_2$=CX(Z), wherein: (i) X each is independently H or F; and (ii) Z is I, Br, $R_f$—U wherein U=I or Br and $R_f$=a perfluorinated or partially perfluorinated alkylene group optionally containing ether linkages or (b) $Y(CF_2)_q Y$, wherein: (i) Y is independently selected from Br or I or Cl and (ii) q=1-6. In addition, non-fluorinated bromo- or iodo-olefins, e.g., vinyl iodide and allyl iodide, can be used. Exemplary cure site monomers include: $CH_2$=CHI, $CF_2$=CHI, $CF_2$=CFI, $CH_2$=$CHCH_2I$, $CF_2$=$CFCF_2I$, $ICF_2CF_2CF_2CF_2I$, $CH_2$=$CHCF_2CF_2I$, $CF_2$=$CFCH_2CH_2I$, $CF_2$=$CFCF_2CF_2I$, $CH_2$=$CH(CF_2)_6CH_2CH_2I$, $CF_2$=$CFOCF_2CF_2I$, $CF_2$=$CFOCF_2CF_2CF_2I$, $CF_2$=$CFOCF_2CF_2CH_2I$, $CF_2$=$CFCF_2OCH_2CH_2I$, $CF_2$=$CFO(CF_2)_3$—$OCF_2CF_2I$, $CH_2$=CHBr, $CF_2$=CHBr, $CF_2$=CFBr, $CH_2$=$CHCH_2Br$, $CF_2$=$CFCF_2Br$, $CH_2$=$CHCF_2CF_2Br$, $CF_2$=$CFOCF_2CF_2Br$, $CF_2$=CFCl, I—$CF_2$—$CF_2CF_2$—O—CF=$CF_2$, I—$CF_2$—$CF_2CF_2$—O—$CF_2CF$=$CF_2$, I—$CF_2$—$CF_2$—O—$CF_2$—CF=$CF_2$, I—$CF(CF_3)$—$CF_2$—O—CF=$CF_2$, I—$CF(CF_3)$—$CF_2$—O—$CF_2$—CF=$CF_2$, I—$CF_2$—$CF_2$—O—$CF(CF_3)$—$CF_2$—O—CF=$CF_2$, I—$CF_2$—$CF_2$—O—$CF(CF_3)$—$CF_2$—O—$CF_2$—CF=$CF_2$, I—$CF_2$—$CF_2$—(O—$(CF(CF_3)$—$CF_2)_2$—O—CF=$CF_2$, I—$CF_2$—$CF_2$—(O—$(CF(CF_3)$—$CF_2)_2$—O—$CF_2$—CF=$CF_2$, Br—$CF_2$—$CF_2$—O—$CF_2$—CF=$CF_2$, Br—$CF(CF_3)$—$CF_2$—O—CF=$CF_2$, I—$CF_2$—$CF_2$—$CF_2$—O—$CF(CF_3)$—$CF_2$—O—CF=$CF_2$, I—$CF_2$—$CF_2$—$CF_2$—O—$CF(CF_3)$—$CF_2$—O—$CF_2$—CF=$CF_2$, I—$CF_2$—$CF_2$—$CF_2$—(O—$(CF(CF_3)$—$CF_2)_2$—O—CF=$CF_2$, I—$CF_2$—$CF_2$—$CF_2$—O—$(CF(CF_3)$—$CF_2$—$O)_2$—$CF_2$—CF=$CF_2$, Br—$CF_2$—$CF_2$—$CF_2$—O—CF=$CF_2$, Br—$CF_2$—$CF_2$—$CF_2$—O—$CF_2$—CF=$CF_2$, I—$CF_2$—$CF_2$—O—$(CF_2)_2$—O—CF=$CF_2$, I—$CF_2$—$CF_2$—O—$(CF_2)_3$—O—CF=$CF_2$, I—$CF_2$—$CF_2$—O—$(CF_2)_4$—O—CF=$CF_2$, I—$CF_2$—$CF_2$—O—$(CF_2)_2$—O—$CF_2$—CF=$CF_2$, I—$CF_2$—$CF_2$—O—$(CF_2)_3$—O—$CF_2$—CF=$CF_2$, I—$CF_2$—$CF_2$—O—$(CF_2)_2$—O—$CF(CF_3)$ $CF_2$—O—$CF_2$—$CF_2$, I—$CF_2$—$CF_2$—O—$(CF_2)_2$—O—CF $(CF_3)CF_2$—O—$CF_2$—$CF_2$=$CF_2$, Br—$CF_2$—$CF_2$—O—$(CF_2)_2$—O—CF=$CF_2$, Br—$CF_2$—$CF_2$—O—$(CF_2)_3$—O—CF=$CF_2$, Br—$CF_2$—$CF_2$—O—$(CF_2)_4$—O—CF=$CF_2$, and Br—$CF_2$—$CF_2$—O—$(CF_2)_2$—O—$CF_2$—CF=$CF_2$. Examples of nitrile containing cure site monomers correspond to the following formula: $CF_2$=CF—$CF_2$—O—Rf—CN; $CF_2$=$CFO(CF_2)_r CN$; $CF_2$=$CFO[CF_2CF(CF_3)O]_p(CF_2)_v OCF(CF_3)CN$; and $CF_2$=$CF[OCF_2CF(CF_3)]_k\overset{.}{O}(CF_2)_u CN$; wherein, r represents an integer of 2 to 12; p represents an integer of 0 to 4; k represents 1 or 2; v represents an integer of 0 to 6; u represents an integer of 1 to 6; and Rf is a perfluoroalkylene or a bivalent perfluoroether group. Specific examples of nitrile containing fluorinated monomers include, but are not limited to, perfluoro (8-cyano-5-methyl-3,6-dioxa-1-octene), $CF_2$=$CFO(CF_2)_5 CN$, and $CF_2$=$CFO(CF_2)_3 OCF (CF_3)CN$.

In one embodiment, the fluorinated polymer of the present disclosure comprises at least 0.1, 0.5, 1, 2, or even 2.5 wt % of iodine, bromine, and/or nitrile groups versus the total weight of fluorinated polymer. In one embodiment, the fluorinated polymer comprises no more than 3, 5, 7, or even 10 wt % of iodine, bromine, and/or nitrile groups versus the total weight of the fluorinated polymer.

As used herein the phrase "fluorinated elastomeric gum" refers to a fluoropolymer that can be processed as a traditional elastomer. To be processed as a traditional elastomer means that the fluoropolymer can be processed with a two-roll mill or an internal mixer. Mill blending is a process that rubber manufacturers use to combine the polymer gum with the requisite curing agents and/or additives. In order to be mill blended, the fluorinated elastomeric gum must have a sufficient modulus. In other words, not too soft that it sticks to the mill, and not too stiff that it cannot be banded onto mill. In one embodiment, the fluorinated elastomeric gum of the present disclosure has a modulus of at least 0.1, 0.3, or even 0.5 MPa (megaPascals); and at most 2.5, 2.2, or even 2.0 MPa at 100° C. as measured at a strain of 1% and a frequency of 1 Hz (Hertz).

The fluorinated elastomeric gum may be perfluorinated or partially fluorinated. As disclosed herein, in a perfluorinated polymer, the carbon-hydrogen bonds along the backbone of the fluorinated polymer are all replaced with carbon-fluorine bonds and optionally some carbon-chlorine and/or carbon-bromine bonds. It is noted that the backbone of the polymer excludes the sites of initiation and termination of the polymer. As disclosed herein, in a partially fluorinated polymer, the polymer comprises at least one carbon-hydrogen bond and at least one carbon-fluorine bond on the backbone of the polymer excluding the sites of initiation and termination of the polymer. In one embodiment, the fluorinated polymer is highly fluorinated, wherein at least 50, 60, 70, 80, or even 85% of the polymer backbone comprises C—F bonds and at most 90, 95, or even 99%.

In one embodiment, the fluorinated polymer may be derived from one or more fluorinated monomer(s) such as TFE (tetrafluoroethylene), VF (vinyl fluoride), VDF (vinylidene fluoride), HFP (hexafluoropropylene), pentafluoropropylene, trifluoroethylene, CTFE (chlorotrifluoroethylene), perfluoro ethers (as discussed above), and combinations thereof.

It is known by those of skill in the art to modify the fluorinated elastomeric gum during the polymer formation by the addition of small amounts of other copolymerizable monomers, which may or may not contain fluorine substitution, e.g. ethylene, propylene, butylene and the like. Use of these additional monomers (i.e., comonomers) is within the scope of the present disclosure. Generally, these additional monomers would be used at less than 25 mole percent of the fluoropolymer, preferably less than 10 mole percent, and even less than 3 mole percent.

In one embodiment, the fluorinated elastomeric gum is a random copolymer, which is amorphous, meaning that there is an absence of long-range order (i.e., in long-range order the arrangement and orientation of the macromolecules beyond their nearest neighbors is understood). An amorphous fluoropolymer has no detectable crystalline character by DSC (differential scanning calorimetry), meaning that if studied under DSC, the fluoropolymer would have no melting point or melt transitions with an enthalpy more than 0.002, 0.01, 0.1, or even 1 Joule/gram from the second heat of a heat/cool/heat cycle, when tested using a DSC thermogram with a first heat cycle starting at −85° C. and ramped at 10° C./min to 350° C., cooling to −85° C. at a rate of 10° C./min (minute) and a second heat cycle starting from −85° C. and ramped at 10° C./min to 350° C. Exemplary amorphous random copolymers may include: copolymers comprising TFE and perfluorinated vinyl ethers monomeric units (such as copolymers comprising TFE and PMVE, and copolymers comprising TFE and PEVE); copolymers comprising TFE and perfluorinated allyl ethers monomeric units; copolymers comprising TFE and propylene monomeric units; copolymers comprising TFE, propylene, and VDF monomeric units; copolymers comprising VDF and HFP monomeric units; copolymers comprising TFE, VDF, and HFP monomeric units; copolymers comprising TFE and ethyl vinyl ether (EVE) monomeric units; copolymers comprising TFE and butyl vinyl ether (BVE) monomeric units; copolymers comprising TFE, EVE, and BVE monomeric units; copolymers comprising VDF and perfluorinated vinyl ethers monomeric units (such as copolymers comprising VDF and $CF_2$=$CFOC_3F_7$) monomeric units; an ethylene and HFP monomeric units; copolymers comprising CTFE and VDF monomeric units; copolymers comprising TFE and VDF monomeric units; copolymers comprising TFE, VDF and perfluorinated vinyl ethers monomeric units (such as copolymers comprising TFE, VDF, and PMVE) monomeric units; copolymers comprising VDF, TFE, and propylene monomeric units; copolymers comprising TFE, VDF, PMVE, and ethylene monomeric units; copolymers comprising TFE, VDF, and perfluorinated vinyl ethers monomeric units (such as copolymers comprising TFE, VDF, and $CF_2$=$CFO(CF_2)_3OCF_3$) monomeric units; and combinations thereof. In one embodiment, the fluorinated polymer is not a copolymer comprising VDF and HFP monomeric units.

In one embodiment, the fluorinated elastomeric gum is a block copolymer in which chemically different blocks or sequences are covalently bonded to each other, wherein the blocks have different chemical compositions and/or different glass transition temperatures. In one embodiment, the block copolymer comprises a first block, A block, which is a semi-crystalline segment. If studied under a differential scanning calorimetry (DSC), this block would have at least one melting point temperature ($T_m$) of greater than 70° C. and a measurable enthalpy, for example, greater than 0 J/g (Joules/gram). The second block, or B block, is an amorphous segment, meaning that there is an absence of long-range order (i.e., in long-range order the arrangement and orientation of the macromolecules beyond their nearest neighbors is understood). The amorphous segment has no detectable crystalline character by DSC. If studied under DSC, the B block would have no melting point or melt transitions with an enthalpy more than 2 milliJoules/g by DSC. In one embodiment, the A block is copolymer derived from at least the following monomers: tetrafluoroethylene (TFE), hexafluoropropylene (HFP), and vinylidene fluoride (VDF). In one embodiment, the A block comprises 30-85 wt (weight) % TFE; 5-40 wt % HFP; and 5-55 wt % VDF; 30-75 wt % TFE; 5-35 wt % HFP; and 5-50 wt % VDF; or even 40-70 wt % TFE; 10-30 wt % HFP; and 10-45 wt % VDF. In one embodiment, the B block is a copolymer derived from at least the following monomers: hexafluoropropylene (HFP), and vinylidene fluoride (VDF). In one embodiment, the B block comprises 25-65 wt % VDF and 15-60 wt % HFP; or even 35-60 wt % VDF and 25-50 wt % HFP. Monomers, in addition, to those mentioned above, may be included in the A and/or B blocks. Generally, the weight average of the A block and B block are independently selected from at least 1000, 5000, 10000, or even 25000 daltons; and at most 400000, 600000, or even 800000 daltons. Such block copolymers are disclosed in U.S. Pat. Publ. Nos. 2018-0194888 (Mitchell et al.); 2018/013553 (Mitchell et al.); and 2019-0352444 (Mitchell et al.); and U.S. Appl. No. 62/447,636, filed 18 Jan. 2017; all of which are incorporated herein by reference.

In one embodiment, the amount of the compound of Formula I in curable composition 2 is at least 0.05, 0.1 or even 1 part by weight; and at most 2, 4, 6, or even 10 parts by weight per 100 parts by weight of the fluorinated polymer.

The fluorinated polymer of curable composition 2 can be cured with a peroxide curing agent. In one embodiment, the peroxide is an organic peroxide, preferably, a tertiary butyl peroxide having a tertiary carbon atom attached to peroxy oxygen.

Exemplary peroxides include: benzoyl peroxide; dicumyl peroxide; di-tert-butyl peroxide; di(2-t-butylperoxyisopropyl)benzene; dialkyl peroxide; bis (dialkyl peroxide); 2,5-di-methyl-2,5-di-tert-butylperoxyhexane; 2,4-dichlorobenzoyl peroxide; 1,1-bis(tert-butylperoxy)-3,3,5-trimethylchlorohexane; dibenzoyl peroxide; tertiarybutyl perbenzoate; α,α'-bis(t-butylperoxy-diisopropylbenzene); tert-butyl peroxy isopropylcarbonate (TBIC); tert-butyl peroxy 2-ethylhexyl carbonate (TBEC); tert-amyl peroxy 2-ethylhexyl carbonate; tert-hexylperoxy isopropyl carbonate; di[1,3-dimethyl-3-(t-butylperoxy)butyl] carbonate; carbonoperoxoic acid; O,O'-1,3-propanediyl OO,OO'-bis(1,1-dimethylethyl) ester; tert-butylperoxy benzoate; t-hexyl peroxy-2-ethylhexanoate; t-butyl peroxy-2-ethylhexanoate; di(4-methylbenzoyl) peroxide; laurel peroxide; and cyclohexanone peroxide. Other suitable peroxide curatives are listed in U.S. Pat. No. 5,225,504 (Tatsu et al.), incorporated herein by reference.

The amount of peroxide used generally will be at least 0.1, 0.2, 0.4, 0.6, 0.8, 1, 1.2, or even 1.5; at most 2, 2.25, 2.5, 2.75, 3, 3.5, 4, 4.5, 5, or even 5.5 parts by weight per 100 parts by weight of the fluorinated polymer.

Coagents are reactive additives used to improve the peroxide curing efficiency by rapidly reacting with radicals and potentially suppressing side reactions and/or generating additional crosslinks. The coagent forms a radical through hydrogen abstraction or addition of a radical from the peroxide, which can then react with the polymer through the Br, I, and/or nitrile sites. The coagents are multifunctional polyunsaturated compounds, which are known in the art and include allyl-containing cyanurates, isocyanurates, and phthalates, homopolymers of dienes, and co-polymers of dienes and vinyl aromatics. A wide variety of useful coagents are commercially available including di- and triallyl compounds, divinyl benzene, vinyl toluene, vinyl pyridine, 1,2-cis-polybutadiene and their derivatives. Exemplary coagents include a diallyl ether of glycerin, triallylphosphoric acid, diallyl adipate, diallylmelamine and triallyl isocyanurate (TAIC), tri(methyl)allyl isocyanurate (TMAIC), tri(methyl)allyl cyanurate, poly-triallyl isocyanurate (poly-TAIC), xylylene-bis(diallyl isocyanurate) (XBD), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, and mixtures thereof. Exemplary partially fluorinated compounds comprising two terminal unsaturation sites include: $CH_2=CH—R_{f1}—CH=CH_2$ wherein $R_{f1}$ may be a perfluoroalkylene of 1 to 8 carbon atoms and a fluorine-containing TAIC such as those disclosed in U.S. Pat. No. 6,191,233 (Kishine et al.), incorporated herein by reference.

In one embodiment, the curable composition 2 comprises a peroxide and a coagent, wherein the amount of coagent used generally will be at least 0.1, 0.5, or even 1 part by weight per 100 parts by weight of the fluorinated polymer; and at most 2, 2.5, 3, or even 5 parts by weight per 100 parts by weight of the fluorinated polymer.

Curable Compositions and Processing

The curable compositions of 1 and 2 above can also contain a wide variety of additives of the type normally used in the preparation of elastomeric compositions, such as acid acceptors, process aides, pigments, fillers, pore-forming agents, and those known in the art.

Such fillers include: an organic or inorganic filler such as clay, silica ($SiO_2$), alumina, iron red, talc, diatomaceous earth, barium sulfate, wollastonite ($CaSiO_3$), calcium carbonate ($CaCO_3$), calcium fluoride, titanium oxide, iron oxide and carbon black fillers, a polytetrafluoroethylene powder, PFA (TFE/perfluorovinyl ether copolymer) powder, an electrically conductive filler, a heat-dissipating filler, and the like may be added as an optional component to the composition. Those skilled in the art are capable of selecting specific fillers at required amounts to achieve desired physical characteristics in the cured product. The filler components may result in a cured product that is capable of retaining a preferred elasticity and physical tensile, as indicated by an elongation and tensile strength value, while retaining desired properties such as retraction at lower temperature (TR-10).

In one embodiment, the curable composition and/or cured product comprises less than 40, 30, 20, 15, or even 10% by weight of the filler.

Conventional adjuvants may also be incorporated into the curable composition of the present disclosure to enhance the properties in the resulting cured product. For example, acid acceptors may be employed to facilitate the cure and thermal stability of the compound. Suitable acid acceptors may include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors are preferably used in amounts ranging from at least 1, 2, 4, or even 5%; and at most 10, 15, or even 20% weight per weight of the fluorinated polymer.

In one embodiment, the curable compositions (and the resulting cured articles) are substantially free of inorganic acid acceptors, meaning that the curable composition (or resulting cured article) contains less than 0.5, 0.1, 0.05, 0.01% be weight per weight of the fluorinated polymer, or even no inorganic acid acceptor.

In one embodiment, the curable composition comprises a fluoroaliphatic sulfonamide. Such compounds can be used to improve the cure. Exemplary a fluoroaliphatic sulfonamides include $C_4F_9SO_2NHCH_3$, and $CF_3-(arylC_6F_4)—CF_2SO_2NHC_2H_5$ as disclosed in U.S. Pat. No. 5,500,042 (Grootaert et al.). Such fluoroaliphatic sulfonamides may be used in at least 0.25, 0.5, 1, 2, or even 4% and no more than 5, 8, or even 10% by weight based on the weight of the fluorinated polymer.

The curable fluoropolymer compositions may be prepared by mixing the phthalonitrile-containing compound of Formula I, the fluoropolymer, and any additional components in conventional rubber processing equipment to provide a solid mixture, i.e. a solid polymer containing the additional ingredients, also referred to in the art as a "compound". This process of mixing the ingredients to produce such a solid polymer composition containing other ingredients is typically called "compounding". Such equipment includes rubber mills, internal mixers, such as Banbury mixers, and mixing extruders. The temperature of the mixture during mixing typically will not rise above about 120° C. During mixing the components and additives are distributed uniformly throughout the resulting fluorinated polymer "compound" or polymer sheets. The "compound" can then be extruded or pressed in a mold, e.g., a cavity or a transfer mold and subsequently be oven-cured. In an alternative embodiment, curing can be done in an autoclave.

Pressing of the compounded mixture (i.e., press cure) is typically conducted at a temperature of about 120-220° C., preferably about 140-200° C., for a period of about 1 minute to about 15 hours, usually for about 1-15 minutes. A pressure of about 700-20,000 kPa (kiloPascals), preferably about 3400-6800 kPa, is typically used in molding the composition. The molds first may be coated with a release agent and prebaked.

The molded vulcanizate can be post cured in an oven at a temperature of about 140-240° C., preferably at a temperature of about 160-230° C., for a period of about 1-24 hours or more, depending on the cross-sectional thickness of the sample. For thick sections, the temperature during the post cure is usually raised gradually from the lower limit of the range to the desired maximum temperature. The maximum temperature used is preferably about 260° C., and is held at this value for about 1 hour or more.

In one embodiment, the compound of Formula I has a melting point that is within at least 1, 2, 5, 10, 15, 20, 30, 40, or even 50° C. of the press cure temperature. Having a melting point near the press cure temperature will enable control of the cure. In one embodiment, the melting point of Formula I is at least 100, 120, 130, or even 135° C., and at most 200, 210, 220, or even 230° C.

In one embodiment, after curing the curable composition 1 of the present disclosure, the resulting fluoroelastomer has improved elongation, but low tensile strength as compared to a composition not including the compound of Formula I.

In one embodiment of the present disclosure, after curing the curable composition 2 of the present disclosure, the resulting fluoroelastomer has improved thermal aging.

In one embodiment, the cured fluoroelastomer of the present disclosure has retained physical properties, which are at least 50, 75, 100, or even 125% greater than the same fluoroelastomer not made with the compound of Formula I.

The cured fluoroelastomer is particularly useful as hoses, seals, gaskets, and molded parts in automotive, chemical processing, semiconductor, aerospace, and petroleum industry applications, among others.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Millipore, Saint Louis, Mo., or may be synthesized by conventional methods.

The following abbreviations are used in this section: g=grams, cm=centimeters, min=minutes, h=hours, °C.=degrees Celsius, °F.=degrees Fahrenheit, MPa=megapascals, mol=moles, wt %=weight percent, L=liters, mL=milliliters, NMR=nuclear magnetic resonance, FTIR=Fourier transform infrared spectrophotometry, DSC=differential scanning calorimetry, J=Joules. Abbreviations for materials used in this section, as well as descriptions of the materials, are provided in Table 1.

TABLE 1

| Material | Details |
|---|---|
| Fluoropolymer A | A perfluoroelastomer derived from about 49.2% of TFE, 50.3% of PMVE and 0.5% of $CF_2$=$CFO(CF_2)_3O(CF_2)_2I$ by weight, 72.2% fluorine content by weight, 0.31% iodine content by weight and Mooney Viscosity ML1 + 10 @ 121° C. of 35. |
| Fluoropolymer B | A fluoroelastomer derived from 60.6 wt % vinylidene fluoride (VDF) and 39.4 wt % hexafluoropropylene (HFP) monomer with 65.9 wt % fluorine content and Mooney Viscosity ML1 + 10 @ 121° C. of 28. |
| Fluoropolymer C | A fluoroelastomer derived from 23 wt % tetrafluoroethylene (TFE), 41 wt % hexafluoropropylene (HFP) and 36 wt % vinylidene fluoride (VDF) monomer with 70 wt % fluorine content, 0.3 wt % iodine content and Mooney Viscosity ML1 + 10 @ 121° C. of 20. |
| Carbon Black | Carbon black, available under the trade designation "N990" from Cancarb, Medicine Hat, AB, CA |
| Coagent | Triallyl-isocyanurate commercially available under the trade designation "TAIC" from Nippon Kasei Chemical Co. Ltd., Tokyo, Japan |
| Peroxide | 2,5-dimethyl-2,5-di(t-butylperoxy)-hexane, 50% active, available under the trade designation "VAROX DBPH-50" from Vanderbilt Chemicals, LLC., Norwalk, CT. |
| $Ca(OH)_2$ | An acid acceptor. Calcium hydroxide commercially available under the trade designation "HALLSTAR CALCIUM HYDROXIDE HP-XL" from The Hallstar Company, Chicago, IL, USA |
| MgO | An acid acceptor. Magnesium oxide powder commercially available under the trade designation "ELASTOMAG 170" from Akrochem Corp., Akron, OH, USA |
| $BF_6$ | Bisphenol-AF: 2,2-bis(4-hydroxyphenyl) hexafluoropropane |
| BTPPCl | Benzyl triphenyl phosphonium chloride available from AlfaAesar, Haverhill, MA |
| DMSO | Dimethyl sulfoxide, available from Sigma-Aldrich |
| DMF | Dimethylformamide, available from Sigma-Aldrich |
| C4F9SO2NMe | $C_4F_9$—$SO_2$—NH—$CH_3$, CAS number 68298-12-4, commercially available from Apollo Scientific Fluorine Chemicals |

TABLE 1-continued

| Material | Details |
|---|---|
| SC1 | 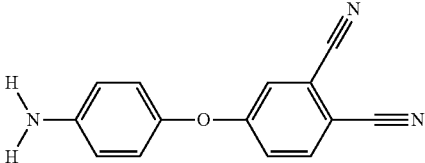 [SMILES: N#Cc1ccc(Oc2ccc(N)cc2)cc1C#N]<br>Can be prepared as described below in Preparatory Example 1 |
| SC2 | 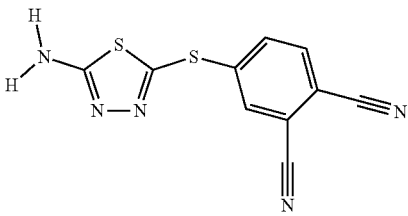 [SMILES: N#Cc1ccc(Sc2nnc(N)s2)cc1C#N]<br>Can be prepared as described below in Preparatory Example 2 |
| SC3 | 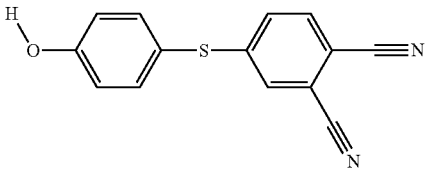 [SMILES: N#Cc1ccc(Sc2ccc(O)cc2)cc1C#N]<br>Can be prepared as described below in Preparatory Example 3 |
| SC4 | 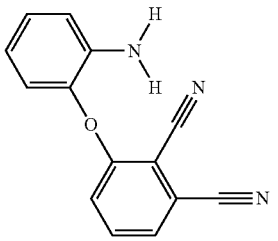 [SMILES: N#Cc1cccc(Oc2ccccc2N)c1C#N]<br>Can be prepared as described below in Preparatory Example 4 |
| SC5 | 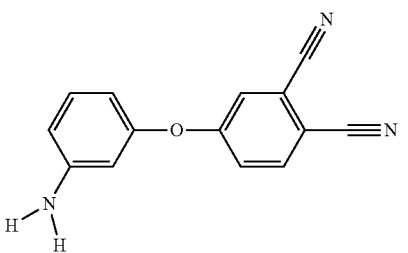 [SMILES: N#Cc1ccc(Oc2cccc(N)c2)cc1C#N]<br>Can be prepared as described below in Preparatory Example 5 |
| SC6 | 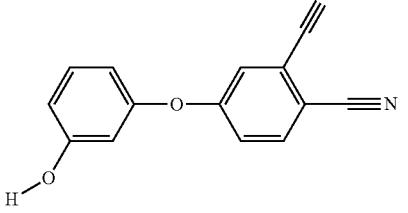<br>Can be prepared as described below in Preparatory Example 6 |

TABLE 1-continued

| Material | Details |
|---|---|
| SC7 | [chemical structure: phenyl with NH2 group, connected via O to benzene ring with two CN groups] Can be prepared as described below in Preparatory Example 7 |

Compounding 200 g polymer batches were compounded with the amounts of materials as listed in Tables 3, 4, 5 and 6 on a two-roll mill.

Physical Properties

Tensile, elongation and modulus data was gathered from both press and post cured samples cut to Die D specifications at room temperature in accordance with ASTM 412-06A. The post cured sampled were tested for heat aging by measuring tensile properties on Die D dumbbells in accordance with ASTM 572-04. Results are reported in Tables 4, 5, and 6.

Molding O-rings and Compression Set

O-rings (214, AMS AS568) were molded at 177° C. for 10 min. The press cured O-rings were post-cured at 232° C. for 4 h. The press cured and post cured O-rings were tested for compression set for 70 h at 200° C. in accordance with ASTM D 395-03 Method B and ASTM D 1414-94 with 25% initial deflection. Results are reported as percentages in Tables 4, 5 and 6.

Preparative Example 1:
4-(4-aminophenoxy)phthalonitrile (SC1)

234.0 g of 4-nitrophthalonitrile and 147.5 g of 4-aminophenol were added to a three neck 3 L round bottom flask. 1000 g of DMSO was added. The flask was fitted with nitrogen gas purge line, a PTFE stir blade and stir rod, a condenser and a thermoprobe. The flask was purged with a continuous nitrogen gas flow. The DMSO solution was mechanically mixed to dissolve the 4-nitrophthalonitrile and 3-aminophenol. After all solids had dissolved in the DMSO, the nitrogen flow valve into the vessel was closed, and 233.5 g of potassium carbonate was added. After the addition, the nitrogen purge through the vessel was resumed. The DMSO solution was heated to 70° C. and maintained with stirring for 3 h. The undissolved salts were separated from the DMSO solution by vacuum filtration through a Buchner funnel with filter paper (grade 4, available under the trade designation "WHATMAN Qualitative filter paper"). The filtered solution was added slowly to 1300 g of stirring cold methanol/water (60/40 by mass). A solid precipitated from solution. The solids were collected by vacuum filtration with a Buchner funnel on filter paper and washed with 500 g of cold methanol/water (60/40 by mass), 500 g of DI (deionized) water and 500 g of cold methanol/water (60/40 by mass). The solids were placed in an aluminum pan and dried in a convection oven set at 120° C. overnight. The total amount of solids collected was 265.6 g (83.5% yield). The solids had a melt temperature of 132° C. as measured by differential scanning calorimetry, and were identified as 4-(4-aminophenoxy)phthalonitrile by infrared and NMR analysis.

DSC Tm=132° C. FTIR (ATR; cm$^{-1}$): 3455 (—NH), 3375 (—NH), 2236 (—CN), 2229 (—CN), 1252 (C—O—C). $^1$H NMR (500 MHz, CDCl$_3$; δ, ppm): 7.994 (d, 1H), 7.513 (d, 1H), 7.352 (quad, 1H), 6.926 (d, 2H), 6.792 (d, 2H), 4.840 (s, 2H).

Preparative Example 2: 4-S-(5-amino-1,3,4-thiadiazole-2-thio)phthalonitrile (SC2)

100.0 g of 4-nitrophthalonitrile and 76.95 g of 5-amino-2-mercapto-1,3,4-thiadiazole were added to a three neck 3 L round bottom flask. 500 g of DMSO was added. The flask was fitted with nitrogen gas purge line and with a PTFE stir blade and stir rod. The flask was purged with a continuous nitrogen gas flow. The DMSO solution was mechanically mixed to dissolve the 4-nitrophthalonitrile and 5-amino-2-mercapto-1,3,4-thiadiazole. After all solids had dissolved in the DMSO, 15 g of 3 Å (Angstrom) molecular sieves and 100 mL of triethylamine were added in two separate additions. The flask was purged with nitrogen gas for several more min. The nitrogen gas purge line was closed. The open flask neck for the nitrogen purge was sealed with a rubber septum. The flask solution was mechanically stirred for 24 h at ambient temperature. At the end of 24 h, a solid had crystallized out of solution. The solution and crystalline solid were decanted from the flask, leaving the molecular sieves in the flask, and added to 1000 mL of ice water stirring with a mechanical mixer. The separated solid was collected on filter paper using a Buchner funnel with suction and washed with water. The collected solid was placed in an aluminum pan and dried in a convection oven set at 120° C. for 4 h. The dried solid was placed in a 2000 mL beaker and 600 mL of dichloromethane was added to the beaker. The solution was mechanically stirred for 1 hour. The solids were collected on filter paper using a Buchner funnel with suction and washed with dichloromethane. The solids were removed from the Buchner funnel and air dried in an aluminum pan overnight. The solid was orange in color. The total amount of solids collected was 121.9 g (81.4% yield). The solids had a melt temperature of 185° C. as measured by differential scanning calorimetry, and were identified as 4-S-(5-amino-1,3,4-thiadiazole-2-thio)phthalonitrile by infrared and NMR analysis.

DSC T$_m$=185° C. FTIR (ATR; cm$^{-1}$): 3396 (—NH), 3303 (—NH), 2238 (—CN), 2224 (—CN). $^1$H NMR (500 MHz, DMSO; δ, ppm): 8.115 (d, 1H), 8.080 (d, 1H), 7.865 (s, 2H), 7.677 (m, 1H).

Preparative Example 3: 4-S-(4-hydroxyphenylthio)phthalonitrile (SC3)

325 g of DMF followed by 28.68 g of potassium carbonate and 8 g of 3 Å molecular sieves were added to a two necked 1 L round bottom flask. The solution was mechanically stirred for 5 min. 26.19 g of 4-hydroxythiophenol was added to the DMF solution with stirring. The solution was stirred for 15 min with a nitrogen purge through the vessel. 35.93 g of 4-nitrophthalonitrile was added in one addition to the stirring solution. The flask solution was mechanically stirred for 24 h at ambient temperature with a constant nitrogen purge at ambient temperature. The undissolved salts and molecular sieves were separated from the DMF solution by vacuum filtration through a Buchner funnel with filter paper. The filtered solution was added slowly to 650 g of stirring cold methanol/water (60/40 by mass) prepared by pouring methanol over ice and stirring until the ice was dissolved. A solid precipitated from solution. The solution was filtered a second time by vacuum filtration through a Buchner funnel with filter paper to remove the precipitated solids. The filtered solution was stirred and concentrated aqueous HCl was added slowly until the pH of the solution measured one by pH paper. Ice was added to the stirring solution until the formation of a precipitate. The solids were collected by vacuum filtration with a Buchner funnel on filter paper, washed with DI water until the wash water coming through the funnel was neutral and transferred to a beaker. 300 g of methanol was added to the beaker, and the solution was stirred for 15 min. 75 g of ice was added to the stirring methanol solution. After dissolution of the ice, stirring was stopped, and the time was given for the solid to settle and coarsen. The solid was collected by vacuum filtration with a Buchner funnel on filter paper. The collected solid was dried in an oven at 120° C. overnight. The product, 39.8 g (76%), had a melt temperature of 166° C. as measured by differential scanning calorimetry, and was identified as the desired compound by infrared and NMR analysis.

DSC Tm=166° C. FTIR (ATR; cm$^{-1}$): 3365 (—OH), 2240 (—CN). $^1$H NMR (500 MHz, d-DMSO; δ, ppm): 10.215 (s, 1H), 7.951 (d, 1H), 7.738 (d, 1H), 7.436 (m, 2H), 7.307 (quad, 1H), 6.946 (m, 2H).

Preparative Example 4: 3-(2-aminophenoxy)phthalonitrile (SC4)

45.0 g of 3-nitrophthalonitrile and 28.37 g of 2-aminophenol were added to a three neck 500 mL round bottom flask. 250 g of DMSO was added. The flask was fitted with nitrogen gas purge line, a PTFE stir blade and stir rod, a condenser and a thermoprobe. The flask was purged with a continuous nitrogen gas flow. The DMSO solution was mechanically mixed to dissolve the 4-nitrophthalonitrile and 3-aminophenol. After all solids had dissolved in the DMSO, the nitrogen flow valve into the vessel was closed, and 6.75 g of 3 Å molecular sieves and 44.9 g of potassium carbonate were added in two separate additions. After the additions, the nitrogen purge through the vessel was resumed. The DMSO solution was heated to 70° C. and maintained with stirring for 3 h. The undissolved salts and molecular sieves were separated from the DMSO solution by vacuum filtration through a Buchner funnel with filter paper. The filtered solution was added slowly to 450 g of stirring cold methanol/water (60/40 by mass). A solid precipitated from solution. The solids were collected by vacuum filtration with a Buchner funnel on filter paper and washed with 500 g of cold methanol/water (60/40 by mass), 500 g of DI water and 500 g of cold methanol/water (60/40 by mass). The solids were placed in an aluminum pan and dried in a convection oven set at 120° C. overnight. The total amount of solids collected was 50.9 g (83.2% yield). The solids had a melt temperature of 137° C. as measured by differential scanning calorimetry, and were identified as 3-(2-aminophenoxy) phthalonitrile by infrared and NMR analysis.

DSC Tm=137° C. FTIR (ATR; cm$^{-1}$): 3446 (—NH), 3356 (—NH), 2238 (—CN), 2226 (—CN), 1264 (C—O—C). $^1$H NMR (500 MHz, d-Acetone; δ, ppm): 7.819 (t, 1H), 7.697 (d, 1H), 7.119 (t, 1H), 7.089 (d, 1H), 7.062 (d, 1H), 6.982 (d, 1H), 6.723 (t, 1H), 4.929 (s, 2H).

Preparative Example 5: 4-(3-aminophenoxy)phthalonitrile (SC5)

161.0 g of 4-nitrophthalonitrile and 101.48 g of 3-aminophenol were added to a three neck 3 L round bottom flask. 1000 g of DMSO was added. The flask was fitted with nitrogen gas purge line, a PTFE stir blade and stir rod, a condenser and a thermoprobe. The flask was purged with a continuous nitrogen gas flow. The DMSO solution was mechanically mixed to dissolve the 4-nitrophthalonitrile and 3-aminophenol. After all solids had dissolved in the DMSO, the nitrogen flow valve into the vessel was closed, and 26 g of 3 Å molecular sieves and 160.66 g of potassium carbonate were added in two separate additions. After the additions, the nitrogen purge through the vessel was resumed. The DMSO solution was heated to 70° C. and maintained with stirring for 3 h. The undissolved salts and molecular sieves were separated from the DMSO solution by vacuum filtration through a Buchner funnel with filter paper. The filtered solution was added slowly to 1300 g of stirring cold methanol/water (60/40 by mass). A solid precipitated from solution. The solids were collected by vacuum filtration with a Buchner funnel on filter paper and washed with 500 g of cold methanol/water (60/40 by mass), 500 g of DI water and 500 g of cold methanol/water (60/40 by mass). The solids were placed in an aluminum pan and dried in a convection oven set at 120° C. overnight. The total amount of solids collected was 198.9 g (90.9% yield). The solids had a melt temperature of 168° C. as measured by differential scanning calorimetry, and were identified as 4-(3-aminophenoxy) phthalonitrile by infrared and NMR analysis.

DSC Tm=168° C. FTIR (ATR; cm$^{-1}$): 3443 (—NH), 3362 (—NH), 2232 (—CN), 1250 (C—O—C). $^1$H NMR (500 MHz, CDCl$_3$; δ, ppm): 7.707 (d, 1H), 7.286 (d, 1H), 7.257 (quad, 1H), 7.212 (t, 1H), 6.602 (quad, 1H), 6.418 (quad, 1H), 6.371 (t, 1H), 3.849 (s, 2H).

Preparative Example 6: 4-(3-hydroxyphenoxy)phthalonitrile (SC6)

100.0 g of 4-nitrophthalonitrile (0.578 mol) and 127.2 g of resorcinol (1.155 mol) were weighed into a three neck 3 L round bottom flask. 500 g of DMSO was added. The flask was fitted with nitrogen gas purge line and with a PTFE stir blade and stir rod. The flask was purged with a continuous nitrogen gas flow. The nitrogen purge was continued throughout the reaction. The DMSO solution was mechanically stirred to dissolve the 4-nitrophthalonitrile and the resorcinol. After all solids had dissolved in the DMSO, 15 g of 3 Å molecular sieves and 99.8 g of anhydrous potassium carbonate were added in two separate additions. The flask solution mixture was heated to a 75° C. with stirring and held for 6 h. The nitrogen purge was removed, and the solution was allowed to cool to ambient temperature. The undissolved salts and molecular sieves were separated from the DMSO solution by vacuum filtration through a Buchner funnel with filter paper. The filtered solution was added slowly to 1000 g of stirring cold methanol/water (60/40 by mass) prepared by pouring methanol over ice and stirring until the ice was dissolved. A solid precipitated from solution. The solution was filtered a second time by vacuum filtration through a Buchner funnel with filter paper to remove the precipitated solid. The filtered solution was stirred and concentrated aqueous HCl was added slowly until the pH of the solution measured one by pH paper. Ice was added to the stirring solution until the formation of a precipitate. The solid was collected by vacuum filtration with a Buchner funnel on filter paper. The solid was washed with 500 mL of deionized water, 500 mL of 5% aqueous sodium bicarbonate and 500 mL of deionized water. The solid was collected and dried in an oven at 120° C. for 3 h. The product, 87.4 g (64%), had a melt temperature of 160° C. as measured by differential scanning calorimetry, and was identified as the desired compound by infrared and NMR analysis.

DSC Tm=160° C. FTIR (ATR; cm$^{-1}$): 3360 (—OH), 2252 (—CN), 2231 (—CN), 1250 (C—O—C). $^1$H NMR (500 MHz, d-DMSO; δ, ppm): 9.901 (s, 1H), 8.102 (d, 1H), 7.792 (d, 1H), 7.383 (quad, 1H), 7.287 (t, 1H), 6.725 (quad, 1H), 6.592 (quad, 1H), 6.539 (t, 1H).

Preparative Example 7:
4-(2-aminophenoxy)phthalonitrile (SC7)

200.0 g of 4-nitrophthalonitrile and 126.07 g of 2-aminophenol were added to a three neck 3 L round bottom flask. 1000 g of DMSO was added. The flask was fitted with nitrogen gas purge line, a PTFE stir blade and stir rod, a condenser and a thermoprobe. The flask was purged with a continuous nitrogen gas flow. The DMSO solution was mechanically mixed to dissolve the 4-nitrophthalonitrile and 3-aminophenol. After all solids had dissolved in the DMSO, the nitrogen flow valve into the vessel was closed, and 30 g of 3 A molecular sieves and 199.6 g of potassium carbonate were added in two separate additions. After the additions, the nitrogen purge through the vessel was resumed. The DMSO solution was heated to 70° C. and maintained with stirring for 3 hours. The undissolved salts and molecular sieves were separated from the DMSO solution by vacuum filtration through a Buchner funnel with Whatman #4 filter paper. The filtered solution was added slowly to 1300 g of stirring cold methanol/water (60/40 by mass). A solid precipitated from solution. The solids were collected by vacuum filtration with a Buchner funnel on Whatman #4 filter paper and washed with 500 g of cold methanol/water (60/40 by mass), 500 g of DI water and 500 g of cold methanol/water (60/40 by mass). The solids were placed in an aluminum pan and dried in a convection oven set at 120° C. overnight. The total amount of solids collected was 230.0 g (84.6% yield). The solids had a melt temperature of 121° C. as measured by differential scanning calorimetry, and were identified as 4-(2-aminophenoxy)phthalonitrile by infrared and NMR analysis.

DSC Tm=121° C. FTIR (ATR; cm-1): 3473 (—NH), 3380 (—NH), 2233 (—CN), 1246 (C—O—C). 1H NMR (500 MHz, d-Acetone; 6, ppm): 8.011 (d, 1H), 7.526 (d, 1H), 7.336 (quad, 1H), 7.108 (t, 1H), 7.026 (d, 1H), 6.973 (d, 1H), 6.725 (t, 1H), 4.811 (s, 2H).

A TA Instruments Q Series DSC (obtained from TA Instruments, New Castle, Del.) was used to measure the dynamic heat flow of the preparatory examples under application of a constant thermal ramp rate. Approximately 5 milligram (mg) of resin was weighed into an aluminum DSC pan. The sample pan was loaded into the DSC instrument, and the heat flow of the sample was measured in a dynamic DSC measurement with a thermal ramp rate of 1 degree Celsius per minute (° C./min) from 25° C. to 300° C. The melt temperature was measured as the peak temperature of the endothermic heat flow process. The self-polymerization temperature and heat of reaction were measured by the peak temperature of the exothermic heat flow process and integration of the same, respectively, after melting. The results of the analysis are shown in Table 2, where $T_m$=melting point temperature; $T_{1,rxn}$=first exotherm reaction temperature; $T_{2,rxn}$=second exotherm reaction temperature; and dH=heat of reaction.

TABLE 2

| Preparative Example | $T_m$ (° C.) | $T_{1, rxn}$ (° C.) | $dH_1$ J/g | $T_{2, rxn}$ (° C.) | $dH_2$ J/g |
|---|---|---|---|---|---|
| SC-1 | 132 | 244 | 250 | — | — |
| SC-2 | 185 | 198 | 278 | 279 | 264 |
| SC-3 | 166 | 204 | 236 | — | — |
| SC-4 | 137 | 225 | 421 | — | — |
| SC-5 | 168 | 178 | 181 | — | — |
| SC-6 | 160 | 182 | 275 | — | — |
| SC-7 | 121 | 198 | 292 | 231 | 100 |

As shown in Table 2, each of SC-1 to SC-7 had a $T_{1,rxn}$ value indicating a reaction occurring at this temperature. It is surmised that at this temperature, homopolymerization of the compound is occurring. No second isotherm was observed for PE-1, PE-3, PE-4, PE-5, or PE-6.

TABLE 3

| | Example | | | | | | | |
|---|---|---|---|---|---|---|---|---|
| | CE-2 | EX-6 | EX-7 | EX-8 | EX-9 | EX-10 | EX-11 | EX-12 |
| Fluoropolymer B | 100 | 100 | 100 | 100 | 100 | 100 | 100 | 100 |
| Carbon Black | 30 | 30 | 30 | 30 | 30 | 30 | 30 | 30 |
| Ca(OH)$_2$ | 6 | 6 | 6 | 6 | 6 | 6 | 6 | 6 |
| MgO | 3 | 3 | 3 | 3 | 3 | 3 | 3 | 3 |
| BTPPCl | 1 | 1 | 1 | 1 | 1 | 1 | 1 | 1 |
| BF$_6$ | 2.6 | — | — | — | — | — | — | — |
| C$_4$F$_9$SO$_2$NMe | 1 | 1 | 1 | 1 | 1 | 1 | 1 | 1 |
| SC1 | — | 2 | — | — | — | — | — | — |
| SC2 | — | — | 2 | — | — | — | — | — |
| SC3 | — | — | — | 2 | — | — | — | — |
| SC4 | — | — | — | — | 2 | — | — | — |
| SC5 | — | — | — | — | — | 2 | — | — |
| SC6 | — | — | — | — | — | — | 2 | — |

TABLE 3-continued

| | Example | | | | | | | |
|---|---|---|---|---|---|---|---|---|
| | CE-2 | EX-6 | EX-7 | EX-8 | EX-9 | EX-10 | EX-11 | EX-12 |
| SC7 | — | — | — | — | — | — | — | 2 |
| Physical Properties after Post Cure | | | | | | | | |
| Time (h) | 16 | 16 | 4 | 16 | 20 | 20 | 16 | 16 |
| Temperature (° C.) | 250 | 232 | 232 | 232* | 200 | 200 | 200 | 232 |
| Tensile at break, MPa | 12.1 | 7.9 | 13.7 | 7.0 | 15.5 | 14.4 | 10.9 | 11.6 |
| Elongation at break, % | 109 | 126 | 219 | 140 | 256 | 238 | 228 | 187 |
| 50% Modulus, MPa | 4.4 | 2.6 | 2.1 | 2.3 | 2.6 | 2.6 | 1.8 | 2.3 |
| 100% Modulus, MPa | 10.5 | 5.9 | 4.7 | 4.7 | 5.2 | 5.2 | 3.6 | 5.1 |
| Hardness | 82 | 71 | 70 | 69 | 71 | 71 | 68 | 71 |

— means none was used.
*This sample during post cure exhibited off gassing and the cured samples had air pockets therein.

As shown in Table 3, the samples comprising the compound of Formula I all showed good modulus and had a tensile similar to, or better than CE-2, indicating that the compound of Formula I was acceptable for curing of a fluorinated polymer that is traditionally cured using a $BF_6$ curative.

TABLE 4

| | Example | | |
|---|---|---|---|
| | CE-4 | EX-18 | EX-19 |
| Fluoropolymer B | 100 | 100 | 100 |
| Carbon Black | 30 | 30 | 30 |
| Ca(OH)$_2$ | 6 | 6 | 6 |
| MgO | 3 | 3 | 3 |
| BTPPCl | 1 | 1 | 1 |
| BF$_6$ | 1.5 | 1.5 | 1.5 |
| SC2 | — | 2 | — |
| SC3 | — | — | 2 |
| Physical Properties after Post Cure at 250° C. for 16 hours | | | |
| Tensile, MPa | 13.3 | 14.1 | 14.5 |
| Elongation at break, % | 248 | 143 | 190 |
| 50% Modulus, MPa | 2.5 | 4.4 | 4.2 |
| 100% Modulus, MPa | 4.7 | 9.5 | 7.7 |
| Hardness | 74 | 79 | 82 |
| Compression Set after Post Cure 70 h at 200° C. | 27 | 29 | 33 |

— means none was used.

As shown in Table 4, the addition of $BF_6$, in addition to the compound of Formula I, results in slight improvement in tensile properties, while not appearing to significantly impact the compression set.

TABLE 5

| | Example or Comparative Example | | | | | | | |
|---|---|---|---|---|---|---|---|---|
| | CE1 | EX-1 | EX-2 | EX-3 | EX-4 | EX-5 | EX-6 | EX-7 |
| Fluoropolymer A | 100 | 100 | 100 | 100 | 100 | 100 | 100 | 100 |
| Carbon Black | 30 | 30 | 30 | 30 | 30 | 30 | 30 | 30 |
| Coagent | 3 | 3 | 3 | 3 | 3 | 3 | 3 | 3 |
| Peroxide | 2 | 2 | 2 | 2 | 2 | 2 | 2 | 2 |
| SC1 | — | 2 | — | — | — | — | — | — |
| SC2 | — | — | 2 | — | — | — | — | — |
| SC3 | — | — | — | 2 | — | — | — | — |
| SC4 | — | — | — | — | 2 | — | — | — |
| SC5 | — | — | — | — | — | 2 | — | — |
| SC6 | — | — | — | — | — | — | 2 | — |
| SC7 | — | — | — | — | — | — | — | 2 |
| Physical Properties after Post Cure at 250° C. (482° F.) for 16 h | | | | | | | | |
| Tensile at break, MPa | 21.0 | 17.2 | 21.5 | 19.3 | 19.8 | 19.4 | 21.0 | 20.2 |
| Elongation at break, % | 169 | 122 | 148 | 156 | 158 | 126 | 138 | 127 |
| 50% Modulus, MPa | 4.9 | 7.1 | 7.2 | 5.7 | 7.1 | 7.5 | 7.3 | 8.1 |
| 100% Modulus, MPa | 11.8 | 14.0 | 14.3 | 12.4 | 13.5 | 15.2 | 14.9 | 15.9 |
| Hardness | 81 | 88 | 88 | 83 | 89 | 90 | 89 | 88 |
| Heat Aged at 300° C. (572° F.) for 70 h | | | | | | | | |
| Tensile at break, MPa | 3.0 | 4.1 | 5.8 | NT | 4.2 | 4.2 | 4.0 | 4.8 |
| Elongation at break, % | 776 | 449 | 616 | NT | 459 | 454 | 543 | 558 |
| 50% Modulus, MPa | 2.5 | 3.9 | 4.2 | NT | 3.9 | 3.7 | 4.2 | 3.5 |
| 100% Modulus, MPa | 3.1 | 4.1 | 5.4 | NT | 4.1 | 4.0 | 4.7 | 4.0 |
| Hardness | 78 | 89 | 87 | NT | 88 | 88 | 88 | 88 |
| Compression Set after Post Cure 70 h at 200° C. | 20 | 31 | 23 | NT | 26 | 28 | 26 | 27 |

— means none was used.
NT means not tested.

As shown in Table 5 above, the inclusion of the compounds according to Formula I in a peroxide cure system, showed increased tensile at break with retained elongation properties after heat aging, with some impact on compression set. It is noted that there is improved heat aging properties in a peroxide cure system with the addition of the compound according to Formula (I).

As shown in Table 6 below, the retention of the physical properties, such as tensile, following heat aging are improved for the compounds of Formula I as compared to the comparative example.

TABLE 6

| | Example | | | | | | | |
|---|---|---|---|---|---|---|---|---|
| | CE-3 | EX-12 | EX-13 | EX-14 | EX-15 | EX-16 | EX-17 | EX-18 |
| Fluoropolymer C | 100 | 100 | 100 | 100 | 100 | 100 | 100 | 100 |
| Carbon Black | 30 | 30 | 30 | 30 | 30 | 30 | 30 | 30 |
| Coagent | 3 | 3 | 3 | 3 | 3 | 3 | 3 | 3 |
| Peroxide | 2 | 2 | 2 | 2 | 2 | 2 | 2 | 2 |
| SC1 | — | 2 | — | — | — | — | — | — |
| SC2 | — | — | 2 | — | — | — | — | — |
| SC3 | — | — | — | 2 | — | — | — | — |
| SC4 | — | — | — | — | 2 | — | — | — |
| SC5 | — | — | — | — | — | 2 | — | — |
| SC6 | — | — | — | — | — | — | 2 | — |
| SC7 | — | — | — | — | — | — | — | 2 |
| Physical Properties after Post Cure at 250° C. (482° F.) for 16 h | | | | | | | | |
| Tensile at break, MPa | 21.7 | 20.8 | 24.2 | NT | 21.7 | 21.2 | 21.9 | 21.3 |
| Elongation at break, % | 220 | 224 | 225 | NT | 225 | 206 | 199 | 199 |
| 50% Modulus, MPa | 2.4 | 4.0 | 3.2 | NT | 3.4 | 3.3 | 2.7 | 3.5 |
| 100% Modulus, MPa | 6.3 | 7.4 | 7.1 | NT | 7.2 | 7.4 | 6.5 | 7.9 |
| Hardness | 71 | 84 | 82 | NT | 75 | 80 | 80 | 81 |
| Heat Aged at 270° C. (518° F.) for 70 h | | | | | | | | |
| Tensile at break, MPa | 10.2 | 12.7 | 14.5 | NT | 12.6 | 12.6 | 13.2 | 12.6 |
| Elongation at break, % | 350 | 300 | 330 | NT | NT | NT | 299 | 273 |
| 50% Modulus, MPa | 1.5 | 2.8 | 2.2 | NT | NT | NT | 2.7 | 2.7 |
| 100% Modulus, MPa | 2.4 | 4.5 | 3.7 | NT | NT | NT | 4.5 | 4.5 |
| Hardness | 69 | 82 | 78 | NT | 80 | 81 | 78 | 81 |
| Compression Set after Post Cure 70 h at 200° C. | 26 | 33 | 27 | NT | 32 | 29 | 28 | 30 |

— means none was used.
NT means not tested

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. A curable composition comprising (a) an amorphous partially fluorinated polymer, and (b) a compound of Formula I

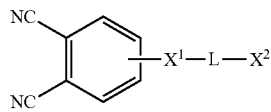

wherein $X^1$ is selected from O or S; L is a divalent linking group comprising at least one aromatic ring; and $X^2$ is selected from the group consisting of a hydroxyl group, an amino group, a thiol group, and a nitrile group.

2. The curable composition of claim 1, wherein the curable composition further comprises a polyhydroxy curative.

3. The curable composition of claim 2, wherein the polyhydroxy curative is selected from at least one of 4,4'-hexafluoroisopropylidenyl bisphenol, 4,4'-dihydroxydiphenyl sulfone, 4,4'-isopropylidenyl bisphenol, 4,4' (perfluoropropane-2,2-diyl)diphenol, dihydroxybenzophenone, hydroquinone, 2,4,6-trimercapto-S-triazine, 4,4'-thiodiphenol, or metal salts thereof.

4. The curable composition of claim 1, wherein the amorphous partially fluorinated polymer comprises (i) vinylidene fluoride, tetrafluoroethylene, and propylene copolymer; (ii) vinylidene fluoride and hexafluoropropylene copolymer; (iii) hexafluoropropylene, tetrafluoroethylene, and vinylidene fluoride copolymer; (iv) hexafluoropropylene and vinylidene fluoride copolymer; (v) tetrafluoroethylene, propylene, and 3,3,3-trifluoropropene copolymer; (vi) tetrafluoroethylene, and propylene copolymer; or (vii) blends thereof.

5. The curable composition of claim 1, wherein the amorphous partially fluorinated polymer comprises (i) at least one of vinylidene fluoride or tetrafluoroethylene, and (ii) a fluorinated comonomer having an acidic hydrogen atom.

6. The curable composition of claim 1, comprising at least 0.1 part by weight of the compound of Formula I to 100 parts by weight of the amorphous partially fluorinated polymer.

7. A curable composition comprising (a) a fluorinated elastomeric gum comprising a fluoropolymer, wherein the fluoropolymer comprises at least one of -I, -Br, or -CN cure site, (b) a peroxide curing system comprising a peroxide and a coagent, and (c) a compound of Formula I

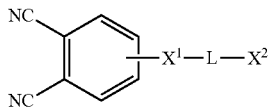

wherein $X^1$ is selected from O or S; L is a divalent linking group comprising at least one aromatic ring; and $X^2$ is selected from the group consisting of a hydroxyl group, an amino group, a thiol group, and a nitrile group.

8. The curable composition of claim 7, wherein the coagent comprises at least one of (i) diallyl ether of glycerin, (ii) triallylphosphoric acid, (iii) diallyl adipate, (iv) diallylmelamine and triallyl isocyanurate, (v) tri(methyl)allyl isocyanurate, (vi) tri(methyl)allyl cyanurate, (vii) poly-triallyl isocyanurate, (viii) xylene bis(diallyl isocyanurate), or (xi) $CH_2$=CH—Rfl—CH=CH2 wherein Rfl is a perfluoroalkylene of 1 to 8 carbon atoms.

9. The curable composition of claim 7, wherein the fluoropolymer comprises at least one of: (i) a copolymer comprising tetrafluoroethylene, vinylidene fluoride, and hexafluoropropylene monomeric units; (ii) a copolymer comprising tetrafluoroethylene, and propylene monomeric units; (iii) a copolymer comprising tetrafluoroethylene, vinylidene fluoride, and propylene monomeric units; and (iv) a copolymer comprising vinylidene fluoride, perfluoro (methyl vinyl) ether, and hexafluoropropylene monomeric units; (v) a copolymer comprising tetrafluoroethylene, vinyl fluoride, and hexafluoropropylene monomeric units; (vi) a copolymer comprising vinyl fluoride, perfluoro (methyl vinyl) ether, and hexafluoropropylene monomeric units; (vii) a copolymer of tetrafluoroethylene with perfluorovinyl ether, and (viii) a copolymer of tetrafluoroethylene with perfluoroallyl ether.

10. The curable composition of claim 7, comprising at least 0.05 parts by weight of the compound of Formula I per 100 parts of the amorphous fluoropolymer.

11. The curable composition of claim 1, wherein L is

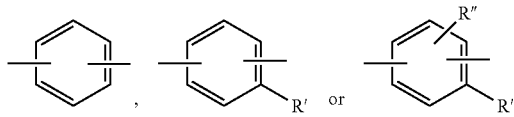

wherein R' and R" are independently selected from a methyl, methoxy, ethyl, ethoxy, propyl, propoxy, butyl, or butoxy groups.

12. The curable composition of claim 1, wherein L is

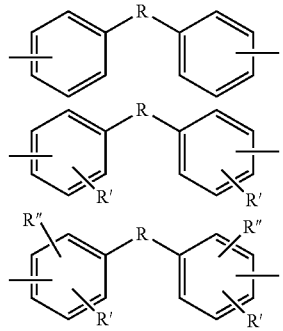

wherein R is selected from —S—, —O—, —$C(CF_3)_2$—, —$C(CH_3)_2$—, —$CH_2$—, —$SO_2$—, —C(=O)—, or —$C(CH_3)_2$—$C_6H_4$—$C(CH_3)_2$—; each R' and each R" are independently selected from a methyl, methoxy, ethyl, ethoxy, propyl, propoxy, butyl, or butoxy groups.

13. The curable composition of claim 1, wherein L comprises an aromatic 5-membered ring.

14. The curable composition of claim 1, wherein L comprises at least 2 aromatic rings.

15. The curable composition of claim 1, wherein —L—$X^2$ is

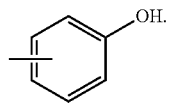

16. The curable composition of claim 1, wherein —L—$X^2$ is

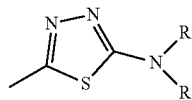

wherein R is independently selected from H, or a C1-C6 alkyl group.

17. The curable composition of claim 1, wherein $X^2$ is a primary amine, or a secondary amine.

18. A cured article derived from the curable composition of claim 1.

19. The cured article of claim 18, wherein the cured article is an o-ring, a seal, a gasket, a hose, or a sheet.

* * * * *